UNITED STATES PATENT OFFICE.

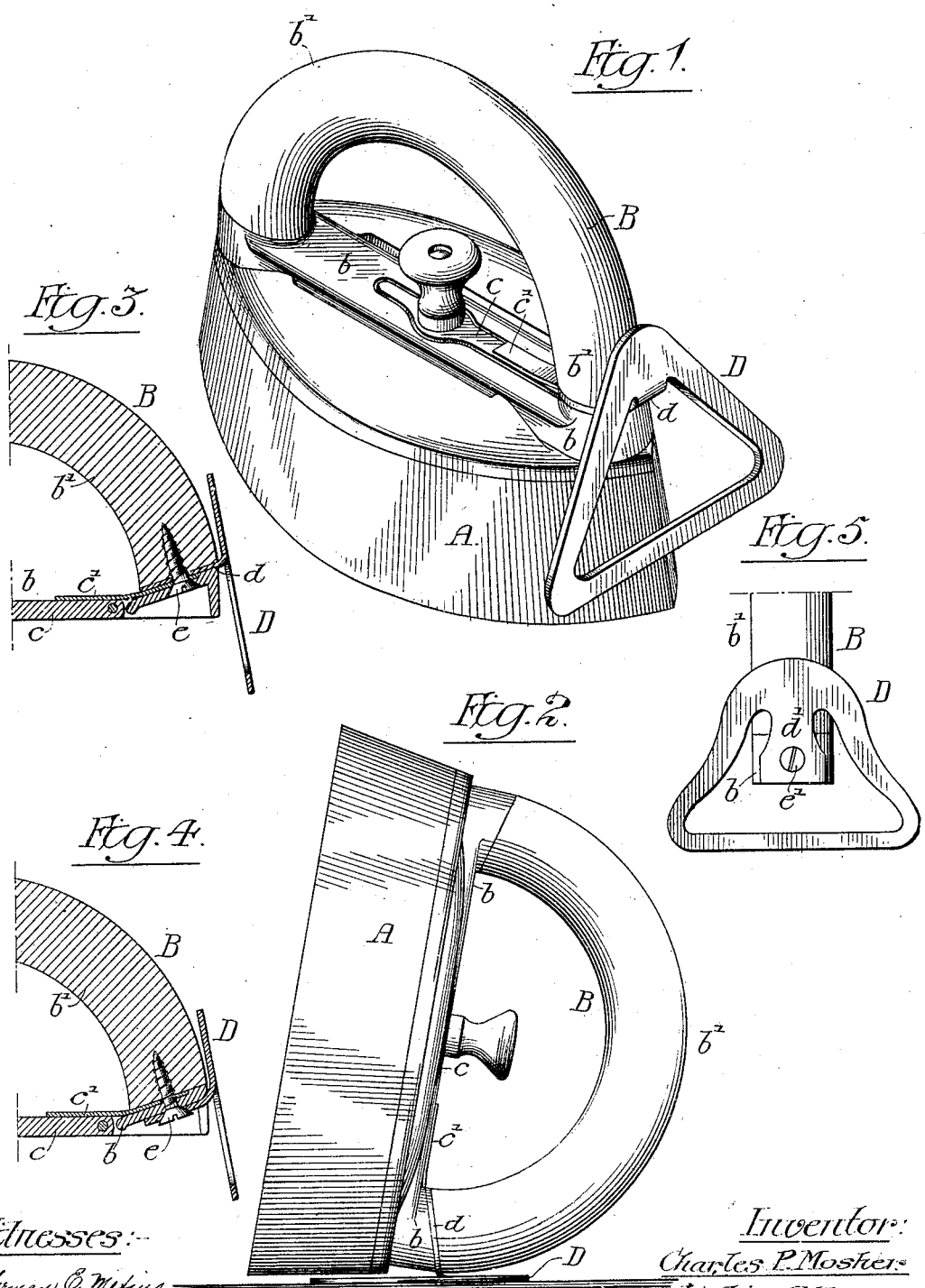

CHARLES P. MOSHER, OF PHILADELPHIA, PENNSYLVANIA, ASSIGNOR TO THE ENTERPRISE MANUFACTURING COMPANY OF PENNSYLVANIA, OF PHILADELPHIA, PENNSYLVANIA, A CORPORATION OF PENNSYLVANIA.

SAD-IRON REST.

No. 831,456.     Specification of Letters Patent.     Patented Sept. 18, 1906.

Application filed November 10, 1900. Serial No. 36,099.

*To all whom it may concern:*

Be it known that I, CHARLES P. MOSHER, a citizen of the United States, residing in Philadelphia, Pennsylvania, have invented certain Improvements in Sad-Iron Rests, of which the following is a specification.

The object of my invention is to provide a rest for a sad-iron, the rest being secured to the handle of the iron.

The iron illustrated in the drawings is of the double-pointed type, having a detachable handle and known as the "Mrs. Potts" sad-iron, patent for which was granted to Mary F. Potts on April 4, 1871, No. 113,448.

In the accompanying drawings, Figure 1 is a perspective view of a sad-iron, showing the handle in position. Fig. 2 is a view showing the sad-iron supported by the rest. Fig. 3 is a sectional view of one portion of the handle, showing one method of attaching the rest to the handle; and Figs. 4 and 5 are views showing modifications of the means of attachment.

A is the sad-iron, in the present instance of the double-pointed type, although it will be understood that the iron may be square at the rear, if necessary, and B is the handle. This handle B has a cross-bar $b$, made of metal and provided with a catch $c$, held in position by a spring $c'$, the catch engaging a cross-bar on the body of the iron. This method of securing the handle to the body of the iron is common in sad-irons of this type.

The handhold $b'$ is made of wood and is secured to the bar $b$ by wood-screws $e$, as clearly shown in Fig. 3.

Attached to one end of the handle B is the rest D. This rest in the present instance is triangular in shape and may be either plain, as shown in Fig. 1, curved, as shown in Fig. 5, or of any shape which will provide a suitable support for the handle and its iron. It has been found, however, that the triangular shape seems to be preferable. The rest has an open center, which prevents the overheating of the metal of the rest and, furthermore, prevents the iron from slipping when supported by the rest as the soft cover of the ironing-board will enter the opening. The rest D has a tongue $d$, which is bent from the cut-out center, and this tongue is attached to one end of the handle. In Fig. 3 I have shown the tongue mounted between the plate $b$ and the wooden handhold $b'$ of the handle B and secured by means of the screw $e$. In Fig. 4 I have shown the rear of the bar $b$ cut away the width of the tongue and the tongue mounted between the head of the screw $e$ and the bar $b$.

In Fig. 5 I have shown the tongue $d'$ simply rounded to conform to the shape of the rounded portion of the end of the handle and secured to the bar $b$ by an independent screw $e'$.

As shown clearly in Fig. 2, the rest D does not come in contact with the body A of the iron, but is a certain distance away from the body, so as to allow a clear air-space between the two.

The rest shown in the drawings may be made and sold independently of the sad-iron handle and may be secured to the handles now in common use by simply detaching the screw $e$ from one end of the handle and passing the tongue $d$ between the handhold and the bar, as shown in Fig. 3.

I claim as my invention—

1. The combination of a sad-iron, its handle, a rest made of a triangular sheet of metal having an open center and having a tongue bent from said rest and clamped between the two parts of the handle of the iron, the said rest forming the whole support of the iron when tilted, substantially as described.

2. As a new article of manufacture, a rest to be permanently secured to the handle of a sad-iron and made of sheet metal, having a flat triangular bearing-surface and an open center, and having a securing-tongue projecting from the inner edge of the triangular bearing-surface and at an angle thereto so that it can be readily secured to the handle of the sad-iron, substantially as described.

In testimony whereof I have signed my name to this specification in the presence of two subscribing witnesses.

CHARLES P. MOSHER.

Witnesses:
   WILL. A. BARR,
   JOS. H. KLEIN.